(12) United States Patent
Job et al.

(10) Patent No.: US 12,455,234 B2
(45) Date of Patent: Oct. 28, 2025

(54) REAL TIME MINE MONITORING SYSTEM AND METHOD

(71) Applicant: PlotLogic Pty Ltd, Queensland (AU)

(72) Inventors: Andrew Job, Queensland (AU); Michael Edgar, Queensland (AU)

(73) Assignee: Plotlogic Pty Ltd, Queensland (AU)

( * ) Notice: Subject to any disclaimer, the term of this patent is extended or adjusted under 35 U.S.C. 154(b) by 516 days.

(21) Appl. No.: 17/780,949

(22) PCT Filed: Nov. 25, 2020

(86) PCT No.: PCT/AU2020/051275
§ 371 (c)(1),
(2) Date: May 27, 2022

(87) PCT Pub. No.: WO2021/108838
PCT Pub. Date: Jun. 10, 2021

(65) Prior Publication Data
US 2023/0003918 A1    Jan. 5, 2023

(30) Foreign Application Priority Data
Dec. 2, 2019   (AU) ................................ 2019904547

(51) Int. Cl.
*G01N 21/359*    (2014.01)
*G01S 7/481*    (2006.01)
(Continued)

(52) U.S. Cl.
CPC .......... *G01N 21/359* (2013.01); *G01S 7/4817* (2013.01); *G01S 17/86* (2020.01);
(Continued)

(58) Field of Classification Search
CPC ........ H04N 23/11; G06V 20/52; G06V 10/82; G06V 10/143; G06V 20/194; G01S 17/88;
(Continued)

(56) References Cited

U.S. PATENT DOCUMENTS

| 8,315,838 B2 | 11/2012 | Durrant-Whyte et al. |
| 8,857,915 B2 | 10/2014 | Nieto et al. |

(Continued)

FOREIGN PATENT DOCUMENTS

| CA | 2897043 | 2/2016 |
| KR | 10-1979936 | 5/2019 |
| WO | WO PCT/AU2020/051275 | 11/2021 |

OTHER PUBLICATIONS

Durrant-Whyte et al., "How Digital Innovation Can Improve Mining Productivity", Metals & Mining, Nov. 2015, United States, 14 pages.
(Continued)

*Primary Examiner* — An H Do
(74) *Attorney, Agent, or Firm* — Wells St. John P.S.

(57) ABSTRACT

The present invention relates to a method for detecting changes in the ore grade of a rock face in near real time. The method includes the step of providing a scanning system having at least a hyperspectral imager, a position system, a LiDAR or range determination unit and computational resources. Further, the method involves determining a precise location of the scanning system utilising the position system. The rock face is scanned with the range determination unit to determine rock face position information. The method involves scanning the rock face with the hyperspectral imager to produce a corresponding rock face hyperspectral image. Further the method involves utilising the computational resources to fuse together the rock face position (Continued)

information and the corresponding rock face hyperspectral image to produce a rock face position and content information map of the rock face.

20 Claims, 6 Drawing Sheets (51) Int. Cl.
| | |
|---|---|
| *G01S 17/86* | (2020.01) |
| *G01S 17/89* | (2020.01) |
| *G01V 8/02* | (2006.01) |
| *G06T 7/00* | (2017.01) |
| *G06V 10/143* | (2022.01) |
| *G06V 10/82* | (2022.01) |
| *G06V 20/10* | (2022.01) |
| *G06V 20/52* | (2022.01) |
| *H04N 23/11* | (2023.01) |

(52) U.S. Cl.
CPC ............... *G01S 17/89* (2013.01); *G01V 8/02* (2013.01); *G06T 7/0008* (2013.01); *G06V 10/143* (2022.01); *G06V 10/82* (2022.01); *G06V 20/194* (2022.01); *G06V 20/52* (2022.01); *H04N 23/11* (2023.01); *G06T 2207/10028* (2013.01); *G06T 2207/30136* (2013.01)

(58) Field of Classification Search
CPC ........ G01S 17/89; G01S 7/4817; G01S 17/86; G01N 21/359; G01N 2021/8411; G06T 7/0008; G06T 2207/10028; G06T 2207/30136; G01V 8/02; G06N 3/088; G06N 3/045; G06F 18/23
See application file for complete search history.

(56) References Cited

U.S. PATENT DOCUMENTS

| | | | |
|---|---|---|---|
| 9,396,528 B2* | 7/2016 | Pacifici | ................ G06T 5/20 |
| 2009/0240481 A1 | 9/2009 | Durrant-Whyte et al. | |
| 2009/0256412 A1 | 10/2009 | Nieto et al. | |
| 2018/0031422 A1 | 2/2018 | Murphy et al. | |

OTHER PUBLICATIONS

Gallie et al., "Estimating Sulphide Ore Grade in Broken Rock using Visible/Infrared Hyperspectral Reflectance Spectra", International Journal of Remote Sensing vol. 23, 2002, United Kingdom, pp. 2229-2246.
Job et al., "Real-Time Shovel-Mounted Coal or Ore Sensing", Iron Ore Conference, Jul. 2017, Australia, pp. 397-405.
Murphy et al., "Evaluating Classification Techniques for Mapping Vertical Geology Using Field-Based Hyperspectral Sensors", IEEE Transactions on Geoscience and Remote Sensing, 2012, United States, 15 pages.
Murphy et al., "Mapping Clay Minerals in an Open-Pit Mine using Hyperspectral and LiDAR Data", European Journal of Remote Sensing 48, 2015, Italy, pp. 511-526.
Murphy et al., "Mapping Layers of Clay in a Vertical Geological Surface using Hyperspectral Imagery: Variability in Parameters of SWIR Absorption Features under Different Conditions of Illumination", Remote Sensing vol. 6, 2014, United Kingdom, pp. 9104-9129.
Murphy, "Evaluating Simple Proxy Measures for Estimating Depth of the ~1900 nm Water Absorption Feature from Hyperspectral Data Acquired under Natural Illumination", Remote Sensing of Environment 166, 2015, United States, pp. 22-33.
Schneider et al., "A Geological Perception System for Autonomous Mining", IEEE International Conference on Robotics and Automation, May 2012, United States, pp. 2986-2991.
Windrim et al., "Unsupervised Feature-Learning for Hyperspectral Data with Autoencoders", Remote Sensing 11(864), 2019, Switzerland, 19 pages.

* cited by examiner

REAL TIME MINE MONITORING SYSTEM AND METHOD

RELATED PATENT DATA

This application is a 35 U.S.C. § 371 of and claims priority to PCT International Application Number PCT/AU2020/051275, filed 25 Nov. 2020, was published in English, and which claims priority to AU patent application No. 2019904547, filed 2 Dec. 2019, the teachings of which are incorporated herein by reference.

FIELD OF THE INVENTION

The present invention provides for systems and methods for the real time monitoring of mining operations.

REFERENCES

1. Durrant-Whyte H, Geraghty R, Pujol F, Sellschop R. How digital innovation can improve mining productivity. McKinsey Co Insights [Internet]. 2015; (November):1-13. Available from: http://www.mckinsey.com/insights/energy_resources_materials/how_digital_innovation-_can_improve_minin g_productivity
2. Job A T, Edgar M L, McAree P R. Real-time shovel-mounted coal or ore sensing. Iron Ore 2017. 2017; (July):397-406.
3. Schneider S, Melkumyan A, Murphy R J, Nettleton E. A geological perception system for autonomous mining. Proc—IEEE Int Conf Robot Autom. 2012; 2986-91.
4. Gallie E A, McArdle S, Rivard B, Francis H. Estimating sulphide ore grade in broken rock using visible/infrared hyperspectral reflectance spectra. Int J Remote Sens [Internet]. 2002; 23:11 (May 2012):2229-46. Available from: http://dx.doi.org/10.1080/01431160110075604
5. Murphy R J, Monteiro S T, Schneider S. Evaluating classification techniques for mapping vertical geology using field-based hyperspectral sensors. IEEE Trans Geosci Remote Sens. 2012; 50(8):3066-80.
6. Murphy R J. Evaluating simple proxy measures for estimating depth of the ~1900 nm water absorption feature from hyperspectral data acquired under natural illumination. Remote Sens Environ. 2015; 166:22-33.
7. Murphy R J, Schneider S, Monteiro S T. Mapping layers of clay in a vertical geological surface using hyperspectral imagery: Variability in parameters of SWIR absorption features under different conditions of illumination. Remote Sens. 2014; 6(9):9104-29.
8. Murphy R J, Schneider S, Taylor Z, Nieto J. Mapping clay minerals in an open-pit mine using hyperspectral imagery and automated feature extraction. Eur J Remote Sens. 2015; 48(1):479-87.

BACKGROUND OF THE INVENTION

Any discussion of the background art throughout the specification should in no way be considered as an admission that such art is widely known or forms part of common general knowledge in the field.

Mining companies have identified that real-time accurate orebody knowledge is of significant economic value. In particular, hyperspectral imaging has been highlighted as a key technique to enable real-time orebody knowledge for precision ore mining. However, while there are many existing commercially available off-the-shelf (COTS) hyperspectral sensors, none of these sensors are Fit-For-Purpose (FFP) for routine mine face mapping. To make these COTS sensors FFP requires significant system customisation to convert raw data streams to useable geo-spatially accurate geological face maps.

SUMMARY OF THE INVENTION

It is an object of the invention, in its preferred form to provide an integrated geological mapping platform, that can be used on a daily basis, in real-time on mine sites covering the full range of mined commodities.

One aspect of the present invention provides a method for detecting changes in the ore grade of a rock face in near real time, the method including the steps of: providing a scanning system having at least a hyperspectral imager, a position system, a LIDAR or range determination unit and computational resources; determining a location of the scanning system utilising the position system; scanning the rock face with the range determination unit to determine rock face position information; scanning the rock face with the hyperspectral imager to produce a corresponding rock face hyperspectral image; utilising the computational resources to fuse together the rock face position information and the corresponding rock face hyperspectral image to produce a rock face position and content information map of the rock face, wherein utilising comprises: determining an initial rock face image using the rock face position information and the determined location; and mapping each portion of a plurality of portions of the rock face hyperspectral image to a corresponding portion in the initial rock face image based on spatial calibration parameters of the hyperspectral imager to produce the rock face position and content information map of the rock face.

Another aspect of the present invention provides a method for detecting changes in the ore grade of a rock face in near real time, the method including: determining an initial rock face image using rock face position information obtained by scanning the rock face with a range determination unit, each portion of the initial rock face image being associated with a geo-referenced coordinate and rock face range data; determining a corresponding rock face hyperspectral image using data obtained by scanning the rock face with a hyperspectral imager; and fusing together the initial rock face image and the corresponding rock face hyperspectral image by mapping each portion of a plurality of portions of the rock face hyperspectral image to a corresponding portion in the initial rock face image based on spatial calibration parameters of the hyperspectral imager to produce a rock face position and content information map of the rock face.

In accordance with a first aspect of the present invention there is provided a method for detecting changes in the ore grade of a rock face in near real time, the method including the steps of: providing a scanning system having at least a hyperspectral imager, a position system, a LiDAR or range determination unit and computational resources; determining a precise location of the scanning system utilising the position system; scanning the rock face with the range determination unit to determine rock face position information; scanning the rock face with the hyperspectral imager to produce a corresponding rock face hyperspectral image; and utilising the computational resources to fuse together the rock face position information and the corresponding rock face hyperspectral image to produce a rock face position and content information map of the rock face.

Preferably, the scanning step includes forming a point cloud of the rock face position and the method includes determining a content information map for points of the point cloud. Preferably, the point cloud position is referenced relative to the precise location of the positioning system.

In some embodiments, the hyperspectral image sensors are calibrated to mitigate the impact of at least one of dark current, smile, keystone, bad pixels and other sensor specific errors.

In some embodiments, the method also includes simultaneously sensing the atmospheric lighting conditions and processing the captured hyperspectral image to account for lighting conditions.

In some embodiments, the method also includes utilising machine learning algorithms to classify the material in the content information map.

BRIEF DESCRIPTION OF THE DRAWINGS

Embodiments of the invention will now be described, by way of example only, with reference to the accompanying drawings in which.

DETAILED DESCRIPTION

The preferred embodiments provide for the ability to map ore faces, in real-time which is of significant economic value to the global mining industry. The preferred embodiments provide for a systems ability to provide requisite information for real-time decision support systems to enhance mine yield and pit-to-port performance, as well as providing the guidance system necessary for fully autonomous mining operations.

The preferred embodiments provide a face mapping system, combining LiDAR, RTK GPS and hyperspectral imaging cameras.

The results provide for a real-time, fusion of spatial and spectral information. Fused datasets for new information not otherwise capable from a standalone system. The purpose of the system is to be able to scan mining terrain in real-time and determine from the results of processing of sensor inputs, the material properties of the terrain.

By providing this information, several benefits could be realised by the mine-site in real-time. For example, the information could be relayed to mining machinery, such as excavators, for real-time precision machine guidance, and the information could be used in real-time decision support systems to optimise the flow of material into the mines processing facility, or to discriminate accurately between ore and waste material, or used to make determinations of stockpile characteristics for processing plant blend optimisation, or for the maximisation of resource recovery.

The major components of the preferred embodiments include: 1. LiDAR or stereo-imaging; 2. High precision GPS, 3. Hyperspectral imaging sensors, 4. High definition RGB, 5. scanning head, 6. On-board computing and 7. Wi-fi data transfer.

A brief summary of how the system works is as follows:
1. Determining the precise location of the scanning system using GPS,
2. Scanning the terrain with a LiDAR or stereo-imaging equipment,
3. Creating a detailed spatial map of the terrain with each point in the point cloud referenced to the GPS coordinate system,
4. Scanning the terrain with hyperspectral imaging sensors, that have been calibrated to mitigate the impact of dark current and smile and keystone and bad pixels and other sensor specific errors,
5. Using an algorithm to map the precise location of obtained hyperspectral pixel information to a GPS referenced position in the previously determined point cloud
6. Using a Fibre Optic Downwelling Irradiance Sensor, or empirically determined algorithm, or empirically captured scene reference data to adjust the captured hyperspectral information for impacts of the atmosphere, if using sunlight as the light source
7. If using an artificial light source, then removing the spectral input profile of the artificial light source from the captured data,
8. If using a combination of natural and artificial light then using an algorithm that accounts for the proportional impacts of each light source on the captured hyperspectral data
9. Using the resulting captured information, applying an algorithm or combination of algorithms that, fuse the textural and structural information captured by the LiDAR or stereo-imaging equipment with the spectral information to make a determination of likely material characteristics,
10. Using the results from the previous step to create a set of spectral and spatial features that may be characteristic of underlying material properties,
11. Using the results from the previous step to make a comparison of spectral and spatial features from a known database of features that relate to underlying material properties,
12. Using the result from the previous step to apply an artificial neural network, that makes a prediction of the material properties for a pixel or set of pixels
13. Using the result from the previous step to compare the material properties against predicted material properties for a block of material
14. Iteratively applying the entire process to make progressively more accurate determinations of material properties across an entire mining operation, including results from processing of material, stockpiles, drill hole data
15. Using the model generated, in real-time, to inform mining equipment on precise digging location and mine operators the recommended optimal decision for mining, processing, stockpiling or depositing as waste material the identified material.

In summary, the LiDAR scans and captures the scene. Data is fused with RTK-GPS so that each pixel in the scene has a precise geo-referenced coordinate. The Scene is then captured with RGB images and hyperspectral images. An Algorithm is applied to accurately add RGB and hyperspectral information to each geo-referenced pixel. A further set of algorithms are then run to:

1. identify structural and textural features form RGB and LiDAR data
2. identify spectral features from hyperspectral data
3. combine the structural, textural and hyperspectral data to make a prediction on the material properties
4. use the output of the combined result as an input for the further identification of the structural model, textural model and hyperspectral model
5. iterate the process until variation of the learned material properties has been minimised
6. output the results to a decision support system.

Example of an Initial Embodiment

An initial simplified embodiment was created which included: Spatial registration of sensors relative to a survey reference frame; Mapping of hyperspectral images onto terrain model built from LiDAR measurements; Ray-casting the LIDAR measurements onto a spherical cell grid. Method for setting integration time so that utilization of digital number range is maximized. Automated reflectance target detection Methods for correcting for atmospheric effects. Web-based interface for remote survey control (includes wi-fi connection to survey system). Use of RTK-GPS to provide geo-reference surveys (terrain and hyperspectral imagery). Fusion of hyperspectral images to provide ENVI-compatible binary for classification. Multiple classification options given ENVI-formatted data cube. Spectral alignment (i.e. reflectance continuity across shared bands of paired cameras). Hyperspectral data filtering.

Extensions can include the addition of environment sensor (e.g. to correct for atmospheric effects), the addition of video data stream (for more data accuracy). The Transition to improved computational resources. Options (linux base computer for surveyor and logging with windows virtual machine, or develop hyspex resource manager for linux either through HySpex provision of interface library. Fusion with translation stage, with/without LiDAR and HD-RGB data stream.

The initial embodiment provides a system capable of acquiring, processing, and classifying hyperspectral data in the field and in real time, mapped to terrain and geo-referenced for integration with mine maps. It is an integrated system that performs push-broom scanning to build a 3D datacube from two individual line-scanning hyperspectral sensors, and also spatially and spectrally fuses the information to provide a single datacube for an entire scene.

The initial embodiment is also Field capable (robust), allows for rotation in more than one axis for performing rock face scans, Terrain mapping, Geo-location, Hyperspectral imaging capabilities from visible to short wave infrared spectrum (400-2500 nm) and is Light vehicle mounted.

Figure 1:
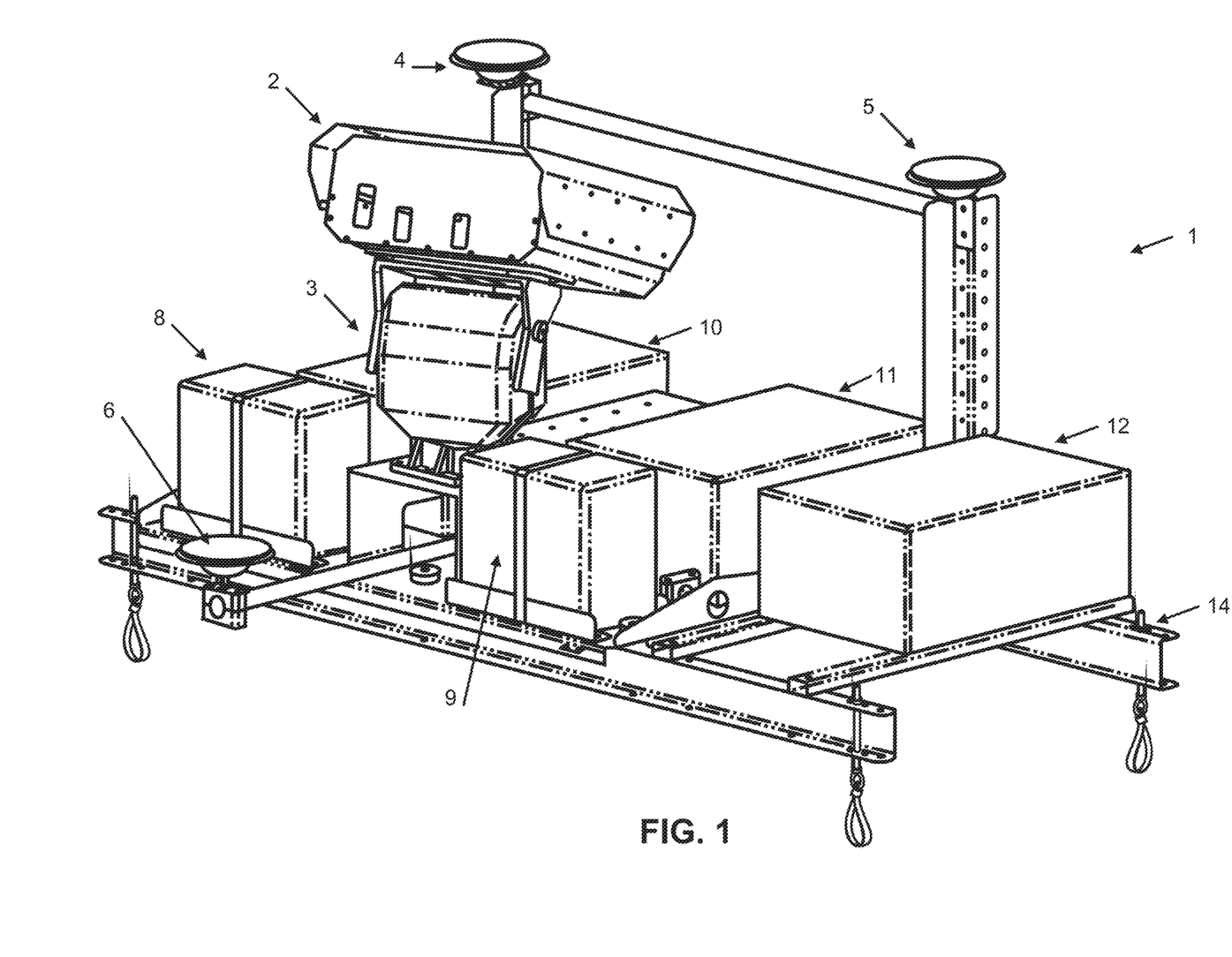
FIG. 1 illustrates an initial prototype system.

Turning initially to FIG. 1, there is illustrated an overall system 1 which is designed to be tray truck mountable. The system 1 includes LiDAR and hyperspectral cameras 2 which are pivot mountable via pivot 3. A high accuracy RTK-GPS system including antennas 4, 5, 6 is also provided. Batteries 8, 9 provide power and three box units 10-12 provide for storage of electronic and computational resources. The system is mounted on base rails 14, which The camera unit 2 consists of a rotating unit on a stationary vehicle-mounted platform. The sensor head 2 on the rotating platform 3 contains a LiDAR for acquiring terrain data to generate a terrain map, and hyperspectral cameras for completing a survey. RTK-GPS is used to geolocate the acquired data. On-board computers within units 10-12 manage data flows and process acquired data, and on-board power 8,9, completes the self-contained system.

Figure 2:
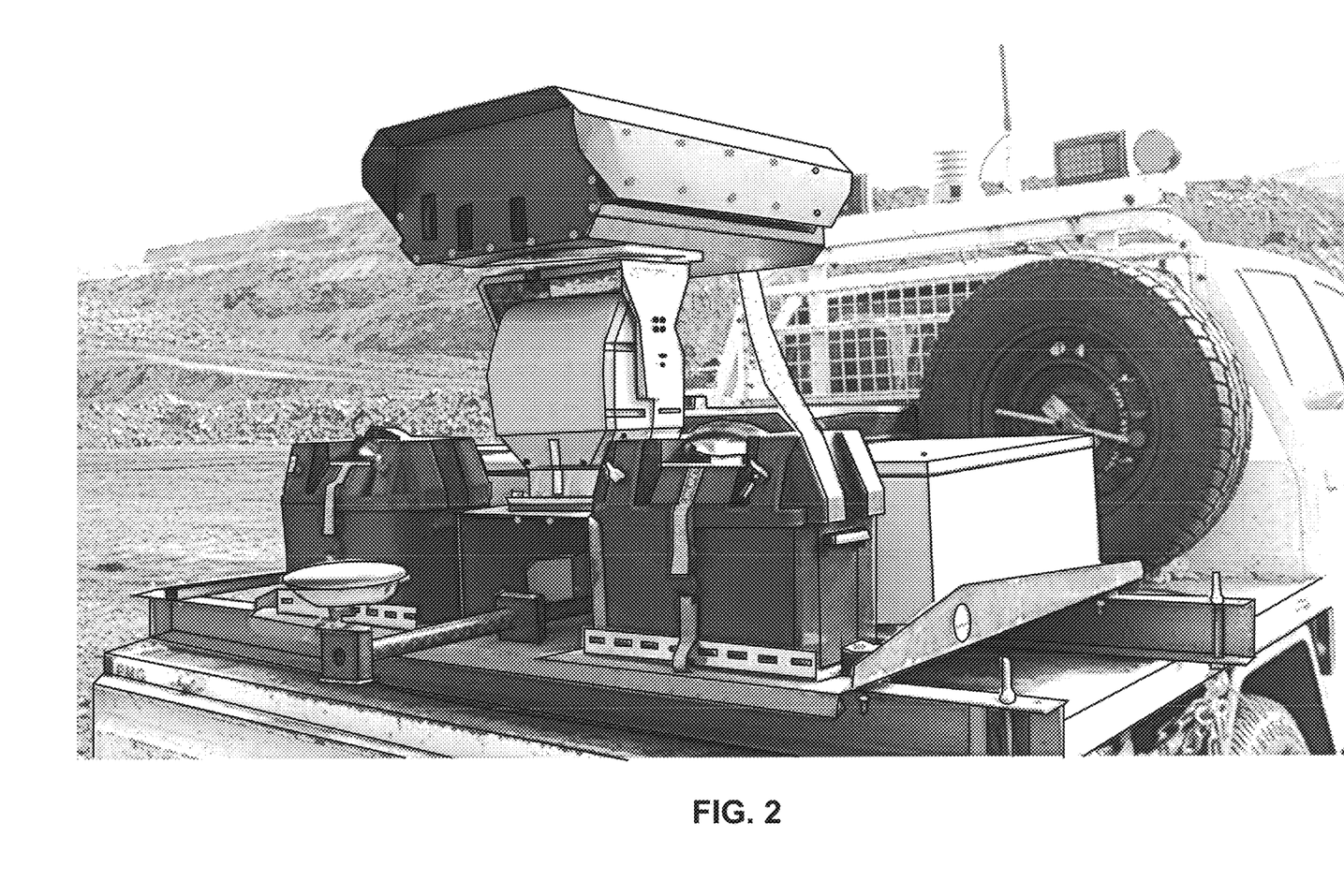
FIG. 2 is an example photo of the prototype system as mounted on a tray truck.

FIG. 2 illustrates a photo of a prototype system mounted on a tray truck. The diagrams illustrate the box units 10-12 used to contain computers, and networking equipment. In addition to the battery units 8,9 used to power the system (and one spare); and the enclosure and sun shield for the head unit, which provides some insulation to reduce the temperature in the head unit while operating in sunlight.

The system can include the following functional components:

Imaging system: The imaging system includes the sensor hardware 1 on the rotating head unit 3 which is used to acquire hyperspectral and terrain data. The hyperspectral cameras can be HySpex VNIR1800 (400-1000 nm) camera and a HySpex SWIR384 (1000-2500 nm) camera. Each camera is a hyperspectral line scanner—each image obtained from the camera has one spatial dimension and provides a full spectral signature for each pixel in that spatial dimension. The cameras are operated in a pushbroom manner (rotating or translating the cameras to obtain successive line scans) to build up a datacube with two spatial dimensions and one spectral dimension. As both cameras have separate fore-optics, different spatial resolutions, and are offset from the centre of rotation of the rotating platform, image registration is required and is a non-trivial task. This is further discussed below.

A secondary challenge associated with the cameras is maximising the dynamic range of the sensor arrays to obtain the best signal to noise ratio during the survey. The sensors are not uniformly sensitive to each wavelength of light, and solar illumination is also not of uniform intensity across the electromagnetic spectrum. Furthermore, the cameras do not automatically adjust the integration time (the exposure period). Adjusting integration time to maximise dynamic range but avoid saturating the sensors is therefore part of the data acquisition workflow. Due to the non-uniform nature of solar illumination and the sensitivity of the cameras at different wavelengths, maximising the dynamic range of the cameras across the whole measured spectrum will not provide a measured radiance curve with uniform signal to noise ratio. The spectra at the ends of the sensor's sensitivity (e.g. greater than abut 2000 nm for the SWIR camera, and greater than about 750 nm for the VNIR camera) will use less of the dynamic range. Hence, an approach to acquisition can be to take multiple scans where the dynamic range utilisation is maximised over different spectral ranges of the cameras, in order to minimise noise in those ranges.

Hyperspectral cameras acquire a measure of the radiance of a pixel that they are scanning. The light incident on the sensor is a function of both the illumination (light source) and how the incident light reflects on the material (which in turn is both dependant on the material itself and its orientation relative to the sensor). In order to perform a correction to compute the reflectance of the material, reflective targets of known spectral reflectance are placed in the surveyed scene. These are used to obtain a measure of the illumination and thus correct for the reflectance of materials in the scene.

A Velodyne VLP-16 LiDAR is used to obtain point-cloud range data and build up a terrain map. The VLP-16 is a 16-beam rotating LiDAR, providing 360° range in the rotating axis and 30° view in the azimuth axis. The LiDAR is mounted sideways so the beams rotate in the vertical plane. Combined with the rotating platform, this gives the best resolution of the face.

Surveying system: Each hyperspectral camera is a line scanning sensor, indicating it only provides an image in one spatial dimension. Likewise, the LiDAR in its vertical orientation has a limited horizontal field of view. The surveying system function is to enable the imaging system to scan a complete scene.

The pan-tilt unit (PT-2050) 3 is the rotating base that enables a complete survey of a scene to be performed with a line-scanning sensor. The ability to tilt also allows the system to build up a composite scene from multiple scans at different tilt angles. The unit has an angular resolution of 0.010, which is sufficient precision to capture a contiguous image with the hyperspectral cameras. While capturing the hyperspectral data, the pan speed is synchronised with the frame rate of the cameras in order to produce a continuous image.

Geo-referencing system: Three GNSS receivers 4, 5, 6 with RTK corrections are used to obtain a pose solution to orient the system when taking field surveys, in order to geolocate the terrain model and data. When both the position of the receivers relative to a reference point which is used as the origin of the system and the position in GPS coordinates is known, an optimisation problem is solved to find the coordinate of the origin in GPS coordinates and the orientation of the system that best fits the receiver locations to the measured coordinates. As the terrain model is stored in a coordinate system relative to the position of the system, this pose and orientation solution can also be used to assign coordinates to every point in the terrain map, and thus reference the terrain and hyperspectral data to the mine map.

Computers and network/information flow: Two embedded computers are used to operate the system, as the API for controlling the HySpex cameras was only provided as a pre-compiled binary for Windows. The remainder of the hardware interfacing and applications are run on a separate Linux machine. Data is distributed between the computers via a wired network. An external laptop is used to interface with the system and provide user input via a web interface.

Each sensor has an associated resource manager that provides an interface to read data packets via the sensor's communication interface, publish it using the middleware software, and command the sensor (where applicable).

The OstkSurveyor is the application which handles the data acquired by the OreSense system and provides an interface for its functions.

Survey data representation and fusion: The primary data being acquired during a survey is the hyperspectral and range data, in order to build up a terrain map. The other data sources provide supporting metadata, such as GPS positioning for geo-location. The problems associated with data representation is how to model the terrain, how to fuse the camera sources, and how to map the hyperspectral image to the terrain model.

The system stores data in a two-dimensional grid-based representation, using spherical coordinates. The centre of the spherical coordinates is at the rotational centre of the system, at the base plate 14 on which the sensors are mounted. A grid array is generated for each survey, representing azimuth (yaw) angle in the x axis and elevation angle in the y axis. The pan and tilt angles of the survey and a fixed resolution are used to generate the extents and size of the grid. To represent terrain, each cell of the grid is populated with a radius measurement, obtained from the LiDAR point cloud, so that each cell specifies an azimuth, elevation and radius that locates a point of the terrain in space.

In order to locate data within the grid, the system software uses the position and orientation of each sensor relative to the spherical coordinate centre to transform and fuse data. Mechanical offsets and the rotation of the pan-tilt unit are modelled by the Surveyor. Each sensor thus has an origin in a local coordinate system that moves as the pan-tilt unit rotates.

The LiDAR resource manager converts the LiDAR returns into (x,y,z) coordinates in the frame of reference of the LiDAR. When the Surveyor receives a packet of LiDAR data, it:

1. Computes the pan and tilt angles of the pan-tilt unit at the time the data was acquired, in order to compute the position and orientation of the LiDAR and its transform to the sphere-centred coordinates.
2. Computes the Cartesian (x,y,z) coordinates of the LiDAR returns in the sphere-centred coordinates.
3. Converts the sphere-centred cartesian coordinates to spherical coordinates (azimuth, elevation, radius).
4. Populates every (azimuth, elevation) cell of the terrain grid with radius information if available from the LiDAR data packet.

Some cells of the grid will be populated more than once with radius information from different returns. In this case, the measurement is added to a rolling average. Some cells are not populated with any data, in which case the grid is interpolated to fill missing data. This cell grid then provides the terrain map for the scene that is mapped to the hyperspectral data.

Both hyperspectral cameras are offset from the centre of rotation of the pan-tilt platform. This poses a challenge for registration of the camera images with each other. Furthermore, the camera images must also be registered with the terrain to provide the desired output of a terrain map with ore grade classifications that can be used to update the mineralogical model of the surveyed area. Calibration information provided with the cameras gives the field of view of each pixel in the spatial dimension of the sensor. This allows the camera focal point to be treated as a point source of a series of vectors (one for each spatial pixel of the sensor), which is then cast to find the intersection with the terrain. Where the ray intersects, the grid of hyperspectral data is populated with the spectral information from that spectral pixel of the sensor. As the pan-tilt unit rotates across the scene, this process is repeated for each new frame of data from the camera. The resulting hyperspectral data is stored in a similar grid of spherical coordinates to the terrain data, with each cell containing a vector of information (the spectral signature measured from that pixel).

This ray casting process generates a grid of hyperspectral data for each camera. Each camera's frame rate is synchronised with the rotation of the pan-tilt unit in order to create a continuous 2D scene at the specified spatial resolution. By using grids with the same angle bounds and resolution, this method generates grids which are spatially aligned and have the same resolution, from data generated from cameras with different spatial resolutions and at different locations. This solves the spatial fusion problem, but the cameras must also be spectrally fused. Spectral fusion is mostly addressed by the illumination correction process which calculates the reflectance values of materials in the scene. However, the cameras have some overlapping wavelengths. This data is simply truncated so that the wavelengths saved in the fused hyperspectral datacube are contiguous.

Scene Acquisition

Scene acquisition consists of three steps, iterating through some until desired performance characteristics are met.

1. Initially, the user specifies angle bounds and integration time for each camera for the scene survey.

2. Perform a scan over the specified angle bounds to obtain lidar data and generate a terrain map. This is a sweep of the scene with only the LiDAR acquiring data. At this step, the user can check that the angle bounds set for the survey have captured the full scene of interest, then adjust and reset the survey if not. The terrain grid can be generated before the hyperspectral cameras acquire data, in order to ensure the terrain grid is fully populated before using it to ray cast the spectral data.
3. Perform a scan with the cameras acquiring data to obtain the 3D hypercube of the scene mapped to the terrain. Now the cameras acquire line scans as the pan-tilt unit pans across the scene, and the Surveyor application fuses the information in the spherical cell-grid representation. The output of this survey is a terrain grid and an ENVI-compatible binary and header file with hyperspectral data, which is written to the disk of the Surveyor computer on the completion of a survey.

This process is performed over a small segment of the scene containing the reflection targets in order to set the integration time so that the dynamic range is best utilised by the cameras in the wavelength region of interest. The user can observe the saturation of pixels in the scene using the visualizer. Pixels which are saturated are highlighted in the scene, and the visualizer can pick pixels and show the spectra for those pixels, to observe what range of the spectrum is saturated. The same process is used to scan a full excavation face, to obtain the scene to be classified.

At the completion of a survey, a terrain map (as a point cloud in spherical grid coordinates) and the hyperspectral data (as an ENVI-compatible binary) are written to file. The duration of a survey over a complete face is between 5-10 minutes, depending on the angle range. Some efficiencies can be gained by improving the computation speed of the fusion process, which is the limiting factor in the survey speed.

The Surveyor web interface is the user interface can include an app which manages the survey workflow data. It allows the user to control the data acquisition process, as well as on-board post-processing and classification workflows. This interface allows remote wired or wireless (over WiFi) connection to the system to control the equipment from an external computer or tablet. The web interface also provides information about the hardware and status of the system.

Figure 3:
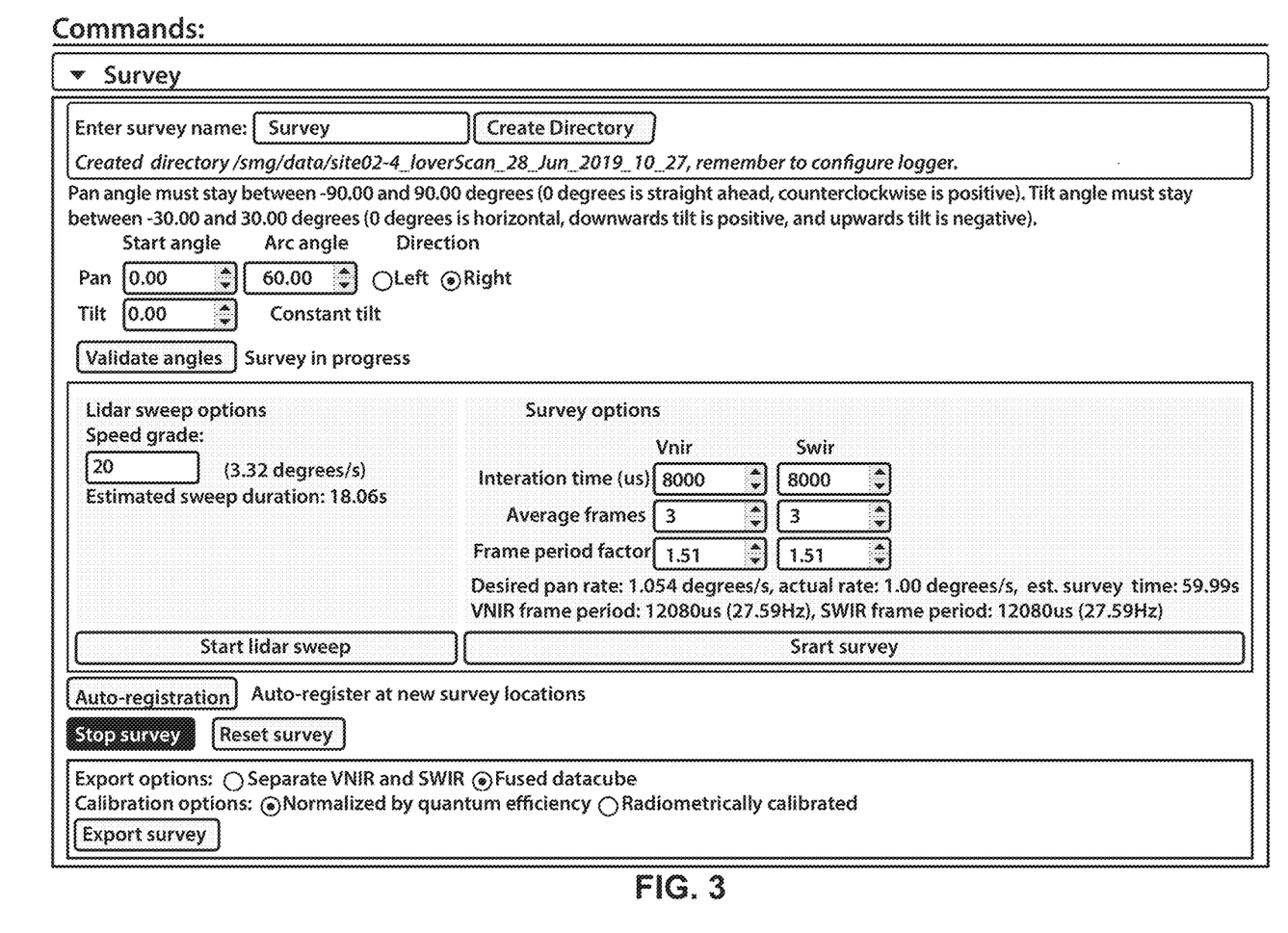
FIG. 3 illustrates an example Surveyor web interface showing command module where the user specifies survey angle bounds and camera integration times.

FIG. 3 illustrates an example surveyor web interface showing command module where the user specifies survey angle bounds and camera integration times.

Survey Data Processing

After acquiring and fusing survey data, the hyperspectral data must be processed to make it suitable for classification. The system can work with artificial broadband illumination sources (such as halogen lights), but the field trials and most surveys can be captured under natural (solar) illumination, which leads to additional processing challenges. Processing steps include filtering noisy bands caused by atmospheric water absorption; computing the reflectance from the at-sensor radiance measures; and spectrally aligning the sensors. All these processes can be automated.

Real-time camera corrections: The data obtained from the hyperspectral cameras has undergone some correction processes by the camera itself, but further corrections may also be required. The camera takes a dark background measure at the start of each survey. This is the average of several frames captured while the shutter to the camera is closed and is a measure of the background noise of the sensor. This can be automatically removed from each frame captured by the camera. The camera sensors undergo a calibration process by the manufacturers, during which the non-uniformity of the sensors is measured. This measures variation in the sensitivity of the sensor array to uniform intensity light at the same spectrum and is also automatically removed from the data that is obtained from the camera. The camera sensors are not uniformly sensitive to each wavelength of light. This is known as the quantum efficiency of a given wavelength, and this correction must be applied after the data is received. The quantum efficiency for each wavelength is provided with the calibration files associated with each camera.

Atmospheric corrections: Water vapour in the atmosphere absorbs light in infrared regions of the electromagnetic spectrum. In these ranges, incident light is partially or completely absorbed, leading to bands of noisy data which must be filtered out. The bands most affected are near 970 nm, 1200 nm, 1450 nm, 1950 nm, and 2500 nm. However, the exact range of the affected bands depends on weather conditions such as the amount of water vapour or cloud in the atmosphere—on cloudier days or under humid conditions, more bands are affected. The spectral bands which are filtered out as part of the atmospheric correction process can be configuration parameters.

Dark current artefacts: Before each survey, both cameras take a measurement of the dark current, which is the response in the sensors when frames are captured with the camera shutter closed. This is done by taking and averaging the signal from 200 frames captured with the shutter closed. This is intended to ensure that when there is no incoming light, the signal can be corrected to return a value of zero. In the absorption bands in the infrared region, all light is absorbed, but a non-zero signal can be observed which increases over the duration of the survey. In a representative sample of scenes from each site, the signal in the absorption bands increases in the scanning direction of each scene, indicating the dark current is increasing while the survey is in process. This may be due to temperature effects from operating in direct sunlight and warm conditions, although each camera has a cooling system.

The effect can be mitigated by taking a dark current measurement after each scan as well as before. These datasets have been corrected by subtracting the measurement in the absorption band from every spectral band in the SWIR camera. The dark current in the SWIR camera is much greater than the dark current in the VNIR camera, and there are no bands in the visible to near infrared spectrum where the atmosphere completely attenuates the incoming light, so the VNIR camera is uncorrected. Comparison of successive scans taken at the same integration time also shows that the dark current measured by the VNIR camera does not increase significantly from one survey to the next, whereas the SWIR camera does, suggesting that the increase in dark current over the course of a survey is less significant or may not occur.

Figure 4:
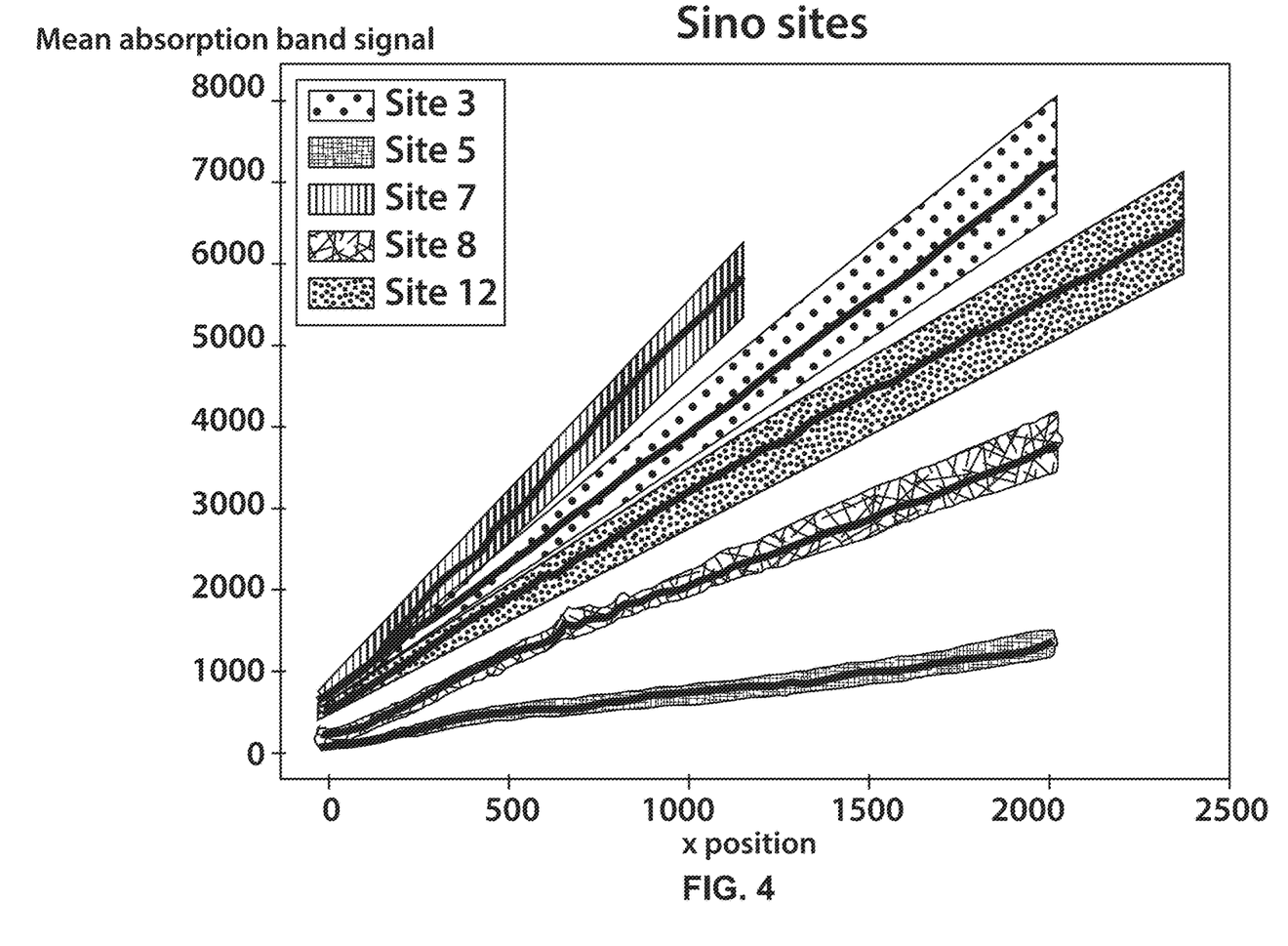
FIG. 4 and FIG. 5 illustrate the mean signal in the atmospheric absorption bands as a function of the x position of the surveyed scene. Each survey was performed with different integration times and different angle bounds, leading to different gradients and lengths of each line.
Figure 5:
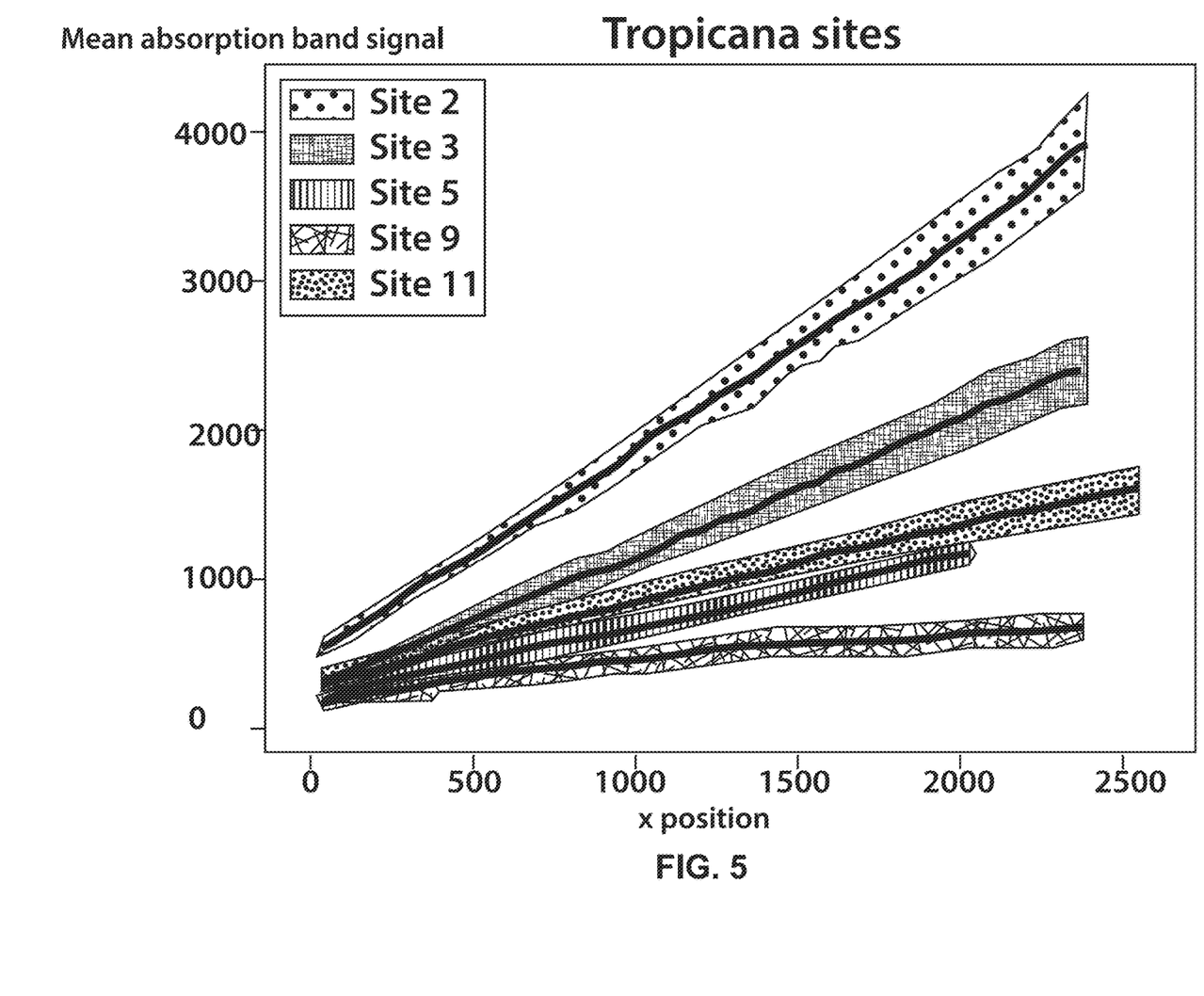

FIG. 4 and FIG. 5 illustrate the mean signal in the atmospheric absorption bands as a function of the x position of the surveyed scene for a series of different sites. Each survey was performed with different integration times and different angle bounds, leading to different gradients and lengths of each line.

Reflectance calculation: Targets of known spectral reflectance can be placed in the surveyed scenes in order to convert sensor radiance measures to material reflectance. The targets have a uniform (or close to uniform) and known reflectance across each spectral wavelength. The reflectance is diffuse, the same from every angle of incidence. The targets used with the system have nominal 50% and 99% reflectance, and both are placed in each surveyed scene. The empirical line method is used to make this correction. This model assumes a linear relationship between the sensor radiance measure and material reflectance, and the radiance of each target is used as a datapoint to compute the gain and offset for the transform. This is done independently for each spectral wavelength, but the same transform is applied at all locations in the scene. In some scenes, the 99% target is saturated, in which case only a gain is computed, using the assumption that the line passes through 0.

There are limitations to this method. Firstly, it assumes that both targets are under the same illumination, which may not be the case if they are oriented differently to each other. Secondly, the position of the targets only represents a single orientation and illumination condition, whereas (a) material in the scene will have many different orientations and be shadowed differently to the targets (particularly for active dig faces where material has been blasted), and (b) the illumination conditions may change over the duration of the scene if there is partial cloud. The first can be addressed by comparing illumination invariant measures such as spectral angle, or by normalising spectral data. In turn, this assumes that the effect of illumination and orientation variation is constant across each wavelength. The second can be addressed by adding an irradiance sensor that is continuously capturing illumination over the duration of the survey. Alternative correction methods should also be considered for scenes where it is not feasible or safe to position the reflective targets close to the scene being surveyed.

Spectral fusion: After computing the reflectance for each camera, there is a slight step discontinuity between the reflectance curves for each camera. This can be caused by slight errors in the registration of the cameras, slight differences in the incidence angles of light based on the spatial offset of each camera, and increased noise at the extremities of each camera's spectral range. When a continuous reflectance is needed, one camera's reflectance curve is multiplied by a constant gain to remove the discontinuity.

Classification

Multiple classification options and how they can be implemented for real-time classification. These can include SAM, CNN (supervised neural networks), Autoencoder (unsupervised neural networks) and Filtering relevant bands (band pass).

With further advances in software and hardware, the system can be reduced in size and weight. The prime avenues for this are removing the second computer, and reducing the weight of the head unit, allowing for a smaller rotating platform.

Field Trials and Datasets

The system was used to obtain laboratory surveys of ore samples, as well as field scans at mine sites. The field surveys include dig faces, pit walls, stockpiles and drill patterns under a variety of illumination conditions.

Ore samples: Prior to the field trials, each mine sent ore samples to develop a library of spectral and associated chemical assay data. After scanning the ore samples with the system, the samples were sent to a laboratory for analysis. The ore samples were scanned indoors, under a broadband illumination source (halogen lights).

Spectral Quality

There are two significant sources of noise in the hyperspectral data: uncertainty in the photoelectron number, which is the number of photoelectrons on the sensor; and uncertainty associated with the dark current, including the artefact correction discussed below.

The uncertainty in the photoelectron number is a result of the statistical fluctuation in photoelectron number, which is governed by a Poisson distribution. The uncertainty is therefore the square root of the signal recorded by the camera with the dark current removed.

Unsupervised Clustering

Unsupervised classification methods address the lack of labelled data in hyperspectral imaging. As hyperspectral images often have many dimensions, and features which distinguish different classes of spectra may occupy few of those dimensions, dimensionality reduction is a key step in unsupervised methods. The goal is to represent the hyperspectral information in a reduced feature space where differences in classes are more significant, enabling unsupervised methods like clustering techniques to better distinguish different data.

The approach here is to use an autoencoder, a symmetric neural network that encodes and decodes an input, with the aim of best reconstructing the input. The loss function used to train the weights is based on the spectral angle of the signatures, with the intention of learning an illumination invariant encoding (Windrim, Ramakrishnan, Melkumyan, Murphy, & Chlingaryan, 2019). This encoding is performed on each spectral pixel (a one-dimensional method). The encoded spectra are then clustered using k-means clustering, typically using the same number of clusters as the number of classes that are expected in the scene.

Unsupervised classification is a good choice for the data from a first site scan, as assays were not performed on rock samples taken directly from the scenes scanned, so an independent verification of the classes does not exist. The classification problem for iron ore is to be able to distinguish different types of ore—haematite, goethite and magnetite—as well as waste.

It is important to note that each scene was clustered separately, so colours in one scene do not correspond to the same colours in another scene. Each scene is classified on a per-pixel basis, which leads to some noise, but each clustered scene shows regions of dominant classes that approximately correspond with the expected boundaries. The locations of the boundaries between classes differs from the ore boundaries determined from discussion with geologists, which may indicate real uncertainty in the location of the boundaries, or inaccuracies in the clustering.

Each scene also shows a class that mostly detects shadowed pixels. While there is some invariance to illumination or darkness of the pixels, particularly in the blue class, this suggests the unsupervised classification may be picking up on illumination or orientation specific features, rather than material properties. This highlights a limitation of the method used to compute the reflectance of each pixel in the scene. The reflective targets are under constant illumination, whereas the surveyed face has significant variations in illumination and orientation of the rocks. The autoencoder uses an error measure based on the spectral angle, which is invariant to a constant change in magnitude of the spectra across each spectral band. This suggests that the effect of illumination variance may not be independent of the wavelength, leading to a learned feature class which is predominantly shadowed rocks.

The second limitation is that unsupervised classification lacks predictive power. While the unsupervised classification can distinguish between different classes, it does not assign labels to those classes. Further work is required to train the autoencoder and to cluster on a larger dataset and test the predictive power on scenes which were not part of the dataset.

It can be seen that the system: is able to prove processed mine face maps, in the field, in real-time, to support mine operators and supervisors implement decisions to maximise mine performance; to be fully self-contained and require minimal training to operate, so that the system can be used autonomously or semi-autonomously every day at the mine site, and be sufficiently robust to be able to operate with high availability and limited maintenance costs.

The system can also reduce ore dilution, increase ore recovery and optimise stockpile blending to maximise plant throughout.

Use Cases:—Coal Mine

A number of example use cases for the system can be envisaged. For example, in a coal mining system, the uses of the system can include:

TABLE 2

Use cases identified at MAC

| Ref. | Use case |
| --- | --- |
| UC1 | Floor/top of coal clean-up to optimise dilution & recovery |
| UC2 | Clay/deleterious material in coal for washability |
| UC3 | Real-time face mapping for weathered zones and ash content |
| UC4 | In-fill bore holes to enhance precision of coal quality model |
| UC5 | Real-time stockpile modelling for dynamic tonnage reconciliation |
| UC6 | Post wash quality validation |
| UC7 | Through seam blast reconciliation and movement to optimise dilution/recovery |
| UC8 | Real-time over-the-conveyor monitoring for short interval control |
| UC9 | Long distance geotechnical mapping for slope stability control |
| UC10 | Excavator fitment for dynamic coal quality tracking |

Providing some more details on each use case:

UC1—Floor/top of coal clean-up to optimise dilution & recovery: Purpose: to provide a quantitative system and method that can track and validate the performance of coal preparation and clean-up to pre-agreed standards. Potential Benefits: this use case would support the maximisation of coal recovery and minimisation of raw coal dilution. Field testing approach: scan of the area surface, subsequent processed information comparison against the RGB image, highlighting aspects nonvisible to the naked eye.

UC2—Clay/deleterious material in coal for washability: Purpose: to identify swelling clays from non-swelling clays accurately and quantifiably. Potential Benefits: the application of this use case would be used to support the optimisation of coal handling and processing. Field testing approach: evaluation of the degree of incorporation of mineral matter in the coal organic matrix based on the recognition and identification of clay and deleterious material through specific spectral patterns. For the purpose of this study, clays at MAC were defined into two broad classes, swelling clays and non-swelling clays. It was identified that swelling clays, that is, clays that absorb water, have a deleterious effect on materials handling for the processing plant. As such, the purpose of investigating this UC was to identify a robust technique that could delineate swelling clays from non-swelling clays accurately and quantifiably.

UC3—Real-time dig face mapping: Purpose: to identify variations within a mining seam/location, that may not be present in the existing site geological model. Potential Benefits: this use case could be applied on a real-time basis for real-time decision support before and during mining operations. Field testing approach: the data is captured in real time and integrated with the mine's system. LV system is attached to the back of a vehicle and scans the entire dig face.

UC4—Coal quality model enhancement: Purpose: to create a method that allows for additional information to be added to the coal quality model, that fits in with the existing 'bore hole' method. Potential benefits: this use case could be applied to enhance the coal quality model for the mine site, supporting enhanced accuracy of short-term mine scheduling. Field testing approach: Scan coal dig faces, identify spectral variations and compare against spectral variations in hand samples and assay results to validate potential of the technology for field mapping.

UC5—Real-time stockpile modelling: Purpose: to accurately understand the quality and volume characteristics of coal stockpiles over time. Potential Benefits: the application of this use case could be applied to provide the processing plant certainty of stockpile characteristics during stockpile recovery, for blend and processing optimisation. Field testing approach: scan of multiple positions around the stockpile to identify and recognize the present material through hyperspectral data, enabling a model to be build-up.

UC6—Post wash rapid coal quality validation: Purpose: to provide a secondary technique, that can be deployed to rapidly and non-invasively on product stockpiles. Potential Benefits: this use case could be applied to confirm that product stockpiles are within their target specifications. Field testing approach: scan of multiple positions around the stockpile to confirm and distinguish coal from non-coal material.

UC7—Through seam blast reconciliation and coal seam movement. Purpose: To provide a technique, that can accurately determine if coal has been recovered as coal or waste. Potential benefits: this use case could provide a means for providing guidance for mining, as well as reconciling actual through-seam blast recovery against the planned recovery, on a real-time basis. Additionally, this technique could be used to confirm the movement of the coal seam post-blasting. Field testing approach: scan to confirm and distinguish coal from non-coal material boundaries.

UC8—Real-time over-the-conveyor monitoring: Purpose: to provide a method for validating raw coal quality characteristics before arriving at the processing plant. Potential benefits: This use case could provide a fast and non-invasive method for 'early warning' if the input coal is different to the expected coal specifications. Field testing approach: Scan the material that flows over a conveyor belt extracting valuable information comparable to a pre-existing database.

UC9—Geotechnical highwall lithology mapping: Purpose: to determine if materials that may be detrimental to slope stability, such as swelling clays and the presence of water can be mapped. Potential benefits: this use case could provide new information that enhances geotechnical modelling and further reduces the potential for unplanned slope failure within active mining areas. Field testing approach: geotechnical data acquisition without direct contact with the mapping face, from scans integrated with the system, providing a necessary level of confidence in the stability of areas.

UC10—Excavator fitment for dynamic coal quality tracking: Purpose: to monitor coal quality characteristics on a bucket-by-bucket basis. Potential benefits: This UC would provide the necessary information for short interval control and short-term operational optimisation. Field testing approach: Integrated into the excavator shovel, the system scans vertical lines of the Field of View (FOV) of the entire face while it is digging allowing decisions to be made on a real-time basis.

Use Cases can be explored during field trials.

The system provides for the provision of real time results for the Use Cases. In the field, to support operational decision making and control. The obtained information can further refine and enhance the accuracy of coal quality model predictions.

The system also provides: the ability to provide coal maps and associated data in real-time, mapping of coal from non-coal materials, Identification and mapping of swell from non-swelling clays, and Prediction and modelling of Ash and calorific value.

Some of the benefits of the system will now be discussed:

Real-time mapping and provision of data: A key advantage of the system, is the potential ability to provide data in real-time. In this case, real-time, is defined as being able to obtain the required information, on demand, without any delay that could impact on the timely value of the information. From the scans collected, a number of tests were performed to determine the reliable functionality of the system in relation to real-time mapping. On average, a typical 1,500 m$^2$ scan could be processed within 21 seconds of the data capture phase being completed. The data acquisition phase was found to take between 3-5 minutes, depending on the level of input illumination of the scene. As a result, the system, was able through extensive testing and simulation demonstrate that real-time mapping could be delivered at MAC. This is particularly relevant for the mapping of coal from non-coal it is important to be able to provide this guidance in the field, in real-time, because, if a significant time delay occurs between the capture of data and the communication of information to operators and supervisors, then the opportunity to influence the dilution and recovery of coal might be lost. Additionally, the resulting maps could, through additional algorithms be re-formatted as virtual boreholes or as inputs directly to scheduling software, or any other use case where coal data is required.

Mapping coal from non-coal material: The ability to accurately map coal from non-coal materials is important to provide guidance to operations to maximise coal recovery and minimise dilution. Without this guidance, it can be difficult for mine operators and supervisors to clearly distinguish between coal and non-coal zones, because many non-coal materials, such as shales and mudstones can be often mistaken for coal. To determine the effectiveness of mapping of coal from non-coal, in real-time, scanning of dig areas was conducted. These scans covered both top of coal preparation and coal floor clean-up areas. These areas were selected on the basis of being the critical interfaces where coal either coal recovery is lost, or coal dilution occurs, as an example of the difficulty of picking coal from other materials visually. This technique could be applied, immediately at a coal mine, to provide a trackable metric for coal clean-up performance. By scanning each clean-up with the system, live feedback could be provided to operators and supervisors, as well as providing a daily metric that could be tracked to ensure that over time coal dilution is minimised and coal recovery is maximised. This technique could also be used to 'baseline' optimal clean-ups by seam, which could be used by the preparation plant, geology and mining departments to agree on the standards that should be applied to each the clean-up for each coal type. The system also allows for the ability to map these coal boundaries with high precision. With adequate coal edges mapped a correlation of this new information back to the underpinning geological model can be implemented. This mapping exercise can be used to determine how much the coal seam moved and if coal losses were encountered as a result of a through seam blast. A very strong correlation existed between captured spectral features outside of the visible part of the light spectrum and the material type that was mapped. The technique outlined above could be immediately deployed in a real-time configuration to provide operational support and guidance, resulting in reduced dilution and increased coal recoveries for MAC.

Identification of swelling & non-swelling clays in coal: The identification of swelling from non-swelling clays was addressed in two parts. Firstly, the determination of the existence or not of clay in a scanned scene and then, by determining the type of clay captured. As an example of the technique, large variations in the abundance of aluminium clay can be mapped in the coal seam.

In addition to the clay absorption analysis, different aspects of mineralogy can be mapped by combining spectral measures of ferrous iron, water and clay absorption, and a distribution of these variables in the image produced. Maps of mineral types derived from spectral matching with a spectral library can show different types of clays on the mine wall.

Figure 6:
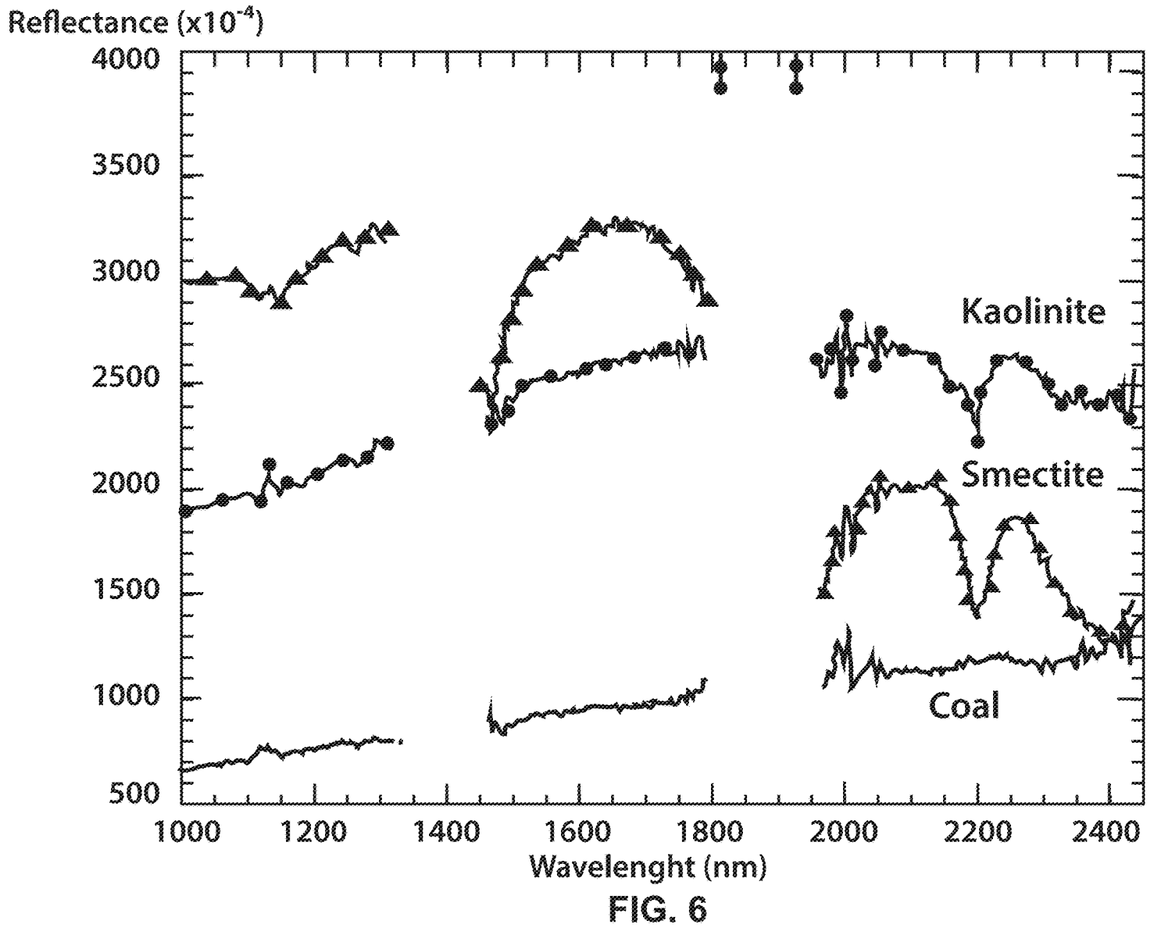
FIG. 6 illustrates typical relative reflectance spectra of coal, swelling clay (smectite) and non-swelling clay (kaolinite).

To further the reliability of these measures, swelling clays, highlighted previously as Smectites can be identified by the shape of their primary absorption feature between 2000-2500 nm. Smectites are the dominant clay group that have swelling properties and can swell up to 4-5 times their volume when wet. Smectites (including Al—OH and Fe—OH smectites) have distinctive absorption features in this spectral region. Both swelling and non-swelling clays (e.g. kaolinite) can be mapped by comparing (unknown) pixel spectra with known library spectra of clay minerals. FIG. 6 shows typical spectra of coal, swelling clay (smectite) and non-swelling clay (kaolinite).

Two example independent methods can be used to map and cross-correlate swelling clay on the mine faces. The first used the method of (6) to estimate the total amount of water contained within the clay i.e. both structural and non-structural (adsorbed) water. This method did not depend on the particular cation in the clay but instead used an estimate of the amount of water contained in all clays. The second method combined information from the classified image of clay type and information on the abundance of clay determined from analysis of the primary Al—OH clay absorption feature, see (7,8) for details.

As a further example of this technique, the classification image can be used to identify swelling clays and then the intensity of the absorption feature was used to map their abundance. The abundance of water on the mine face can shows distinct layering with layers exhibiting large amounts of absorption by water being indicative of smectite clay.

The technique described in this section can be important in mapping swelling clays from non-swelling clays in coal seams, as well as highwalls. As such, the technique has potential to add immediate value for both coal materials handling and to provide additional information for geotechnical modelling.

Complementing the determination of ash content, a strong correlation was drawn with calorific value. As such, the techniques outlined in this section can be applied with high degree of certainty as a method for mapping calorific value of a dig face or coal stockpile.

Overall, the system provides the capability to be able to make predictions for ash or calorific value. The system allows the ability to distinguish between coal and non-coal materials, resulting in the opportunity to reduce coal dilution and simultaneously increase coal recovery, Distinguish between swelling and non-swelling clays for enhanced management of coal handling and ability to improve geotechnical slope stability mapping, and Routinely determine coal stockpile characteristics for reserve reconciliation and optimisation of coal feed to the processing plant. The coal information generated, can also be used in parallel to provide additional information, that could be used to update short-term plans and enhance geological models.

One example specification of the technical components can be as follows:

| Sub-component | Key specification | Purpose |
| --- | --- | --- |
| LiDAR | Operating range 100 m<br>Channels 16<br>Angular resolution 2°<br>Accuracy ± 3 cm | Provide high-resolution spatial information for the construction of accurate 3D maps of mine faces. |
| Hyperspectral sensors | Spectral range 400-2,500 nm<br>F/# > 2.0<br>Field of view > 16°<br>Spectral binning < 6 nm<br>Peak SNR > 255 | Provide highly accurate hyperspectral data across a suitable spectral range that can be input into processing algorithms, in real-time for classification of mine faces. |
| RTK-GPS | Accuracy < 1 cm<br>Modes GPS, GLONASS, BeiDou | Provide support for 6 degrees of freedom (6DoF) pose estimation for high precision positioning of face maps within an existing mine survey |
| Power | Deep cycle lead acid battery | Provide safe and reliable power source for operating in the mine for continuous operations. |
| Computing | Rugged computer system with 1 Tb SSD storage | Provide 'on-board' ability to process and store captured data, for in-field publication of face maps as well as ability to hold sufficient data, that can be periodically transferred to a cloud |

Interpretation

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

As used herein, the term "exemplary" is used in the sense of providing examples, as opposed to indicating quality. That is, an "exemplary embodiment" is an embodiment provided as an example, as opposed to necessarily being an embodiment of exemplary quality.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A method for detecting changes in the ore grade of a rock face, the method including the steps of:
    (a) providing a scanning system having at least a hyperspectral imager, a position system, a LIDAR or range determination unit and computational resources;
    (b) determining a location of the scanning system utilising the position system;
    (c) scanning the rock face with the range determination unit to determine rock face position information;
    (d) scanning the rock face with the hyperspectral imager to produce a corresponding rock face hyperspectral image;
    (e) utilising the computational resources to fuse together the rock face position information and the corresponding rock face hyperspectral image to produce a rock face position and content information map of the rock face, wherein utilising comprises:
        determining an initial rock face image using the rock face position information and the determined location; and
        mapping each portion of a plurality of portions of the rock face hyperspectral image to a corresponding portion in the initial rock face image based on spatial calibration parameters of the hyperspectral imager to produce the rock face position and content information map of the rock face.

2. A method as claimed in claim 1 wherein step (c) includes forming a point cloud of the rock face position and said step (e) includes determining a content information map for points of the point cloud.

3. A method as claimed in claim 1 wherein the point cloud position is referenced, in the initial rock face image, relative to the location of the positioning system.

4. A method as claimed in claim 1 wherein the hyperspectral image sensors are calibrated to mitigate the impact of at least one of dark current, smile, keystone, bad pixels and other sensor specific errors.

5. A method as claimed in claim 1 further including simultaneously sensing the atmospheric lighting conditions and processing the captured hyperspectral image to account for lighting conditions.

6. A method as claimed in claim 1 wherein said step (e) further includes utilising machine learning algorithms to classify the material in the content information map.

7. A method as claimed in claim 1 wherein the rock face is a near vertical rock face.

8. A method as claimed in claim 1, wherein each portion of a plurality of portions of the rock face hyperspectral image is mapped to a corresponding portion in the initial rock face image by ray tracing based on the spatial calibration parameters of the hyperspectral imager.

9. A method as claimed in claim 1, wherein scanning the rock face with the hyperspectral imager further comprises:
    capturing a first hyperspectral image using a first hyperspectral camera of the hyperspectral imager;
    capturing a second hyperspectral image using a second hyperspectral camera of the hyperspectral imager, the first hyperspectral camera and the second hyperspectral camera being offset from a centre of rotation of the scanning system, wherein a frame rate of each hyperspectral camera is synchronised with rotation of the scanning system; and
    spatially fusing image data of the first hyperspectral image and the second hyperspectral image onto the initial rock face image based on spatial calibration parameters of each of the first hyperspectral camera and the second hyperspectral camera.

10. A method as claimed in claim 9, wherein the second hyperspectral image and the first hyperspectral image are captured synchronously.

11. A method as claimed in claim 9, further comprising:
    spectrally fusing image data of the first hyperspectral image and the second hyperspectral image.

12. A method as claimed in claim 11, wherein spectral fusion is based on at least one reflective target of known spectral reflectance captured in the first hyperspectral image and the second hyperspectral image.

13. A method as claimed in claim 9, wherein the first hyperspectral image and the second hyperspectral image are spatially fused onto the initial rock face image based on the spatial calibration parameters of the first hyperspectral camera at the time of capture of the first hyperspectral image and the spatial calibration parameters of the second hyperspectral camera at the time of capture of the second hyperspectral image.

14. A computer-implemented method for detecting changes in the ore grade of a rock face, the method including:
    determining, using a processor, an initial rock face image using rock face position information obtained by scanning the rock face with a range determination unit, each portion of the initial rock face image being associated with a geo-referenced coordinate and rock face range data;
    determining, using the processor, a corresponding rock face hyperspectral image using data obtained by scanning the rock face with a hyperspectral imager having spatial calibration parameters; and
    fusing together, using the processor, the initial rock face image and the corresponding rock face hyperspectral image by mapping each portion of a plurality of portions of the rock face hyperspectral image to a corresponding portion in the initial rock face image based on the spatial calibration parameters of the hyperspectral imager to produce a rock face position and content information map of the rock face.

15. A method as claimed in claim 14, further comprising:
capturing a first hyperspectral image using a first hyperspectral camera of the hyperspectral imager;
capturing a second hyperspectral image using a second hyperspectral camera spaced apart from the first hyperspectral camera; and
spatially fusing image data of the first hyperspectral image and the second hyperspectral image onto the initial rock face image based on spatial calibration parameters of each of the first hyperspectral camera and the second hyperspectral camera.

16. A method as claimed in claim 15, wherein the second hyperspectral image and the first hyperspectral image are captured synchronously.

17. A method as claimed in claim 15, further comprising:
spectrally fusing image data of the first hyperspectral image and the second hyperspectral image.

18. A method as claimed in claim 17, wherein spectral fusion is based on at least one reflective target of reference spectral reflectance captured in the first hyperspectral image and the second hyperspectral image.

19. A method as claimed in claim 15, wherein the first hyperspectral image and the second hyperspectral image are spatially fused onto the initial rock face image based on the spatial calibration parameters of the first hyperspectral camera at the time of capture of the first hyperspectral image and the spatial calibration parameters of the second hyperspectral camera at the time of capture of the second hyperspectral image.

20. A system for detecting changes in the ore grade of a rock face, the system comprising:
a scanning system comprising a hyperspectral imager, a position system and a LiDAR or range determination unit, wherein the position system is configured to provide a location of the scanning system; the range determination unit is configured to scan the rock face to determine rock face position information, and the hyperspectral imager is configured to scan the rock face to produce corresponding rock face hyperspectral image data; and
a computational resource coupled with the scanning system and configured to:
receive the location of the scanning system, the rock face position information and the corresponding rock face hyperspectral image data; and
determine initial rock face image data using the rock face position information and the determined location; and
fuse together the initial rock face image data and the corresponding rock face hyperspectral image data by mapping each portion of a plurality of portions of the rock face hyperspectral image data to a corresponding portion in the initial rock face image data based on spatial calibration parameters of the hyperspectral imager to produce the rock face position and content information map of the rock face.

* * * * *